US012563367B2

(12) United States Patent
Thyagarajan et al.

(10) Patent No.: US 12,563,367 B2
(45) Date of Patent: Feb. 24, 2026

(54) INTEREST INDICATION

(71) Applicant: Nokia Technologies Oy, Espoo (FI)

(72) Inventors: Manivannan Thyagarajan, Dallas, TX (US); Benoist Sebire, Tokyo (JP); Jing He, Beijing (CN)

(73) Assignee: Nokia Technologies, Espoo (FI)

( * ) Notice: Subject to any disclaimer, the term of this patent is extended or adjusted under 35 U.S.C. 154(b) by 247 days.

(21) Appl. No.: 18/249,528

(22) PCT Filed: Oct. 22, 2020

(86) PCT No.: PCT/CN2020/122970
§ 371 (c)(1),
(2) Date: Apr. 18, 2023

(87) PCT Pub. No.: WO2022/082649
PCT Pub. Date: Apr. 28, 2022

(65) Prior Publication Data
US 2023/0379668 A1 Nov. 23, 2023

(51) Int. Cl.
*H04W 4/06* (2009.01)
*H04W 48/14* (2009.01)

(52) U.S. Cl.
CPC ............. *H04W 4/06* (2013.01); *H04W 48/14* (2013.01)

(58) Field of Classification Search
CPC ................................ H04W 4/06; H04W 48/14
See application file for complete search history.

(56) References Cited

U.S. PATENT DOCUMENTS

| | | | |
|---|---|---|---|
| 10,194,281 | B2 | 1/2019 | Saiwai et al. |
| 10,595,167 | B2 | 3/2020 | Chen et al. |
| 2014/0010142 | A1 | 1/2014 | Ranta-Aho et al. |
| 2014/0269566 | A1 | 9/2014 | Wang et al. |
| 2018/0199163 | A1 | 7/2018 | Chen et al. |
| 2019/0158988 | A1 | 5/2019 | Lee et al. |
| 2019/0268830 | A1 | 8/2019 | Kim et al. |

FOREIGN PATENT DOCUMENTS

| | | |
|---|---|---|
| EP | 2262311 B1 | 1/2018 |
| EP | 3481110 A1 | 5/2019 |
| EP | 4156727 A1 | 3/2023 |
| WO | 2021/251804 A1 | 12/2021 |

OTHER PUBLICATIONS

Extended European Search Report received for corresponding European Patent Application No. 20958231.1, dated Jul. 10, 2024, 13 pages.

(Continued)

Primary Examiner — Samina F Choudhry
(74) Attorney, Agent, or Firm — Lippes Mathias LLP

(57) ABSTRACT

An apparatus comprising at least one processor; and at least one memory including computer program code; the at least one memory and the computer program code configured to, with the at least one processor, cause the apparatus to perform: determining system information available from a network; and requesting system information from the network, wherein the request for system information comprises an indication of interest in at least one or more multicast and/or broadcast services.

20 Claims, 5 Drawing Sheets

(56) References Cited

OTHER PUBLICATIONS

"Miscellaneous Aspects of MBS Provisioning", 3GPP TSG-RAN WG2 Meeting #113bis Electronic, R2-2102946, Agenda item: 8.1. 2.4, Nokia, Apr. 12-20, 2021, 2 pages.

"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.2.0, Jul. 2020, pp. 1-390.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.1.1, Jul. 2020, pp. 1-1078.

"3rd Generation Partnership Project; Technical Specification Group Radio Access Network; NR; NR and NG-RAN Overall Description; Stage 2 (Release 16)", 3GPP TS 38.300, V16.2.0, Jul. 2020, pp. 1-148.

"New Work Item on NR support of Multicast and Broadcast Services", 3GPP TSG RAN Meeting #86, RP-193248, Agenda: 9.1.2, Huawei, Dec. 9-12, 2019, 5 pages.

"LS on MBMS Interest Indication for MooD (MBMS operation on Demand)", 3GPP TSG RAN WG2 Meeting #89, R2-150029, TSG SA WG4, Jan. 26-30, 2015, 2 pages.

"[Draft] LS on MBMS Interest Indication for MooD", 3GPP TSG RAN WG2 Meeting #89, R2-150558, Qualcomm, Feb. 9-12, 2015, pp. 1-2.

International Search Report and Written Opinion received for corresponding Patent Cooperation Treaty Application No. PCT/ CN2020/122970, dated Jul. 27, 2021, 10 pages.

"Miscellaneous Aspects of MBS Provisioning", 3GPP TSG-RAN WG2 Meeting #116bis Electronic, R2-2200722, Agenda item: 8.1. 3.1, Nokia, Jan. 17-25, 2022, 2 pages.

Office action received for corresponding Chinese Patent Application No. 202080108097.1, dated Dec. 22, 2025, 8 pages of office action and no page of translation available.

INTEREST INDICATION

RELATED APPLICATION

This application was originally filed as PCT Application No. PCT/CN2020/122970, filed on Oct. 22, 2020, each of which is incorporated herein by reference in its entirety.

TECHNOLOGICAL FIELD

Embodiments of the present disclosure relate to interest indication. Some relate to interest indication upon request for system information.

BACKGROUND

A wireless network comprises a plurality of network nodes including terminal nodes and access nodes. Communication between the terminal nodes and access nodes is wireless.

In some circumstances, a terminal node may request information regarding services available from a network.

BRIEF SUMMARY

According to various, but not necessarily all, embodiments there is provided examples as claimed in the appended claims.

According to various, but not necessarily all, embodiments there is provided an apparatus comprising
at least one processor; and
at least one memory including computer program code;
the at least one memory and the computer program code configured to, with the at least one processor, cause the apparatus to perform:
determining system information available from a network; and
requesting system information from the network, wherein the request for system information comprises an indication of interest in at least one or more multicast and/or broadcast services.

According to various, but not necessarily all, embodiments there is provided a method comprising:
determining system information available from a network; and
requesting system information from the network, wherein the request for system information comprises an indication of interest in at least one or more multicast and/or broadcast services.

According to various, but not necessarily all, embodiments there is provided a computer program comprising instructions for causing an apparatus to perform at least:
determining system information available from a network; and
requesting system information from the network, wherein the request for system information comprises an indication of interest in at least one or more multicast and/or broadcast services.

According to various, but not necessarily all, embodiments there is provided an apparatus comprising means for performing:
determining system information available from a network; and
requesting system information from the network, wherein the request for system information comprises an indication of interest in at least one or more multicast and/or broadcast services.

According to various, but not necessarily all, embodiments there is provided an apparatus comprising
at least one processor; and
at least one memory including computer program code;
the at least one memory and the computer program code configured to, with the at least one processor, cause the apparatus to perform:
receiving a request for system information, wherein the request for system information comprises an indication of interest in at least one or more multicast and/or broadcast services; and
performing one or more actions based, at least in part, on the received indication of interest in at least one or more multicast and/or broadcast services.

According to various, but not necessarily all, embodiments there is provided a method comprising:
receiving a request for system information, wherein the request for system information comprises an indication of interest in at least one or more multicast and/or broadcast services; and
performing one or more actions based, at least in part, on the received indication of interest in at least one or more multicast and/or broadcast services.

According to various, but not necessarily all, embodiments there is provided a computer program comprising instructions for causing an apparatus to perform at least:
receiving a request for system information, wherein the request for system information comprises an indication of interest in at least one or more multicast and/or broadcast services; and
performing one or more actions based, at least in part, on the received indication of interest in at least one or more multicast and/or broadcast services.

According to various, but not necessarily all, embodiments there is provided an apparatus comprising means for performing:
receiving a request for system information, wherein the request for system information comprises an indication of interest in at least one or more multicast and/or broadcast services; and
performing one or more actions based, at least in part, on the received indication of interest in at least one or more multicast and/or broadcast services.

According to various, but not necessarily all, embodiments there is provided a computer program comprising instructions for causing an apparatus to perform at least a part of one or more methods disclosed herein.

According to various, but not necessarily all, embodiments there is provided an apparatus comprising means for performing at least a part of one or more methods disclosed herein.

According to various, but not necessarily all, embodiments there is provided an apparatus comprising
at least one processor; and
at least one memory including computer program code;
the at least one memory and the computer program code configured to, with the at least one processor, cause the apparatus at least to perform at least a part of one or more methods disclosed herein.

The description of a function and/or action should additionally be considered to also disclose any means suitable for performing that function and/or action.

BRIEF DESCRIPTION

Some examples will now be described with reference to the accompanying drawings in which.

DEFINITIONS

Figure 1:
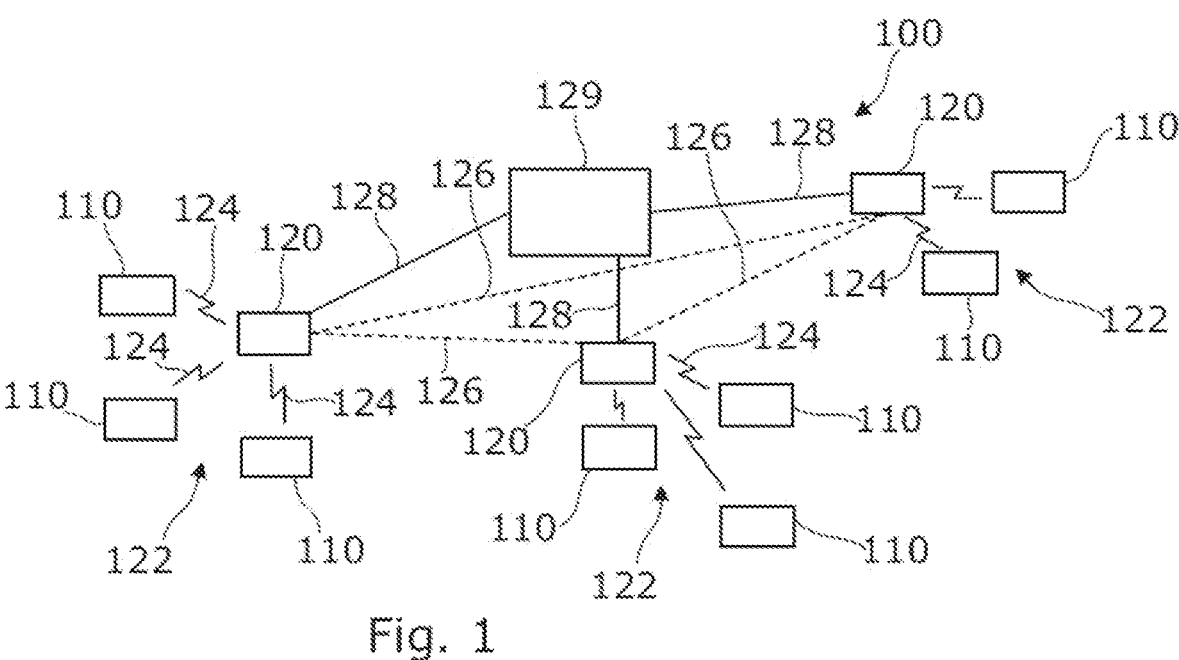
FIG. 1 shows an example of the subject matter described herein.

System information (SI)—Information of a network. Can include information to access the network. Can include information to complete cell selection and cell reselection. Can include information to detect paging messages. System information can be provided in the form of system messages and/or system information blocks. System information can be provided in the form of and/or consist of a master information block (MIB) and a number of system information blocks (SIBs).

MIB contains essential physical layer information of the cell required to receive further system information. SIBs can comprise basic information required for initial access and information for acquiring any other SI and can contain configuration information required for proper system/network operation.

System information message—A message comprising system configuration information organized into SIBs. Can include one or more system information blocks.

System information block—A system information block comprises system configuration information. A system information block can include similar system information elements and/or system information elements having a similar nature and/or relating to the same or similar function and/or concept.

Can comprise cell-reselection information, information about neighbouring cells relevant for cell re-selection, serving and neighbouring frequency information, multicast/ broadcast services (MBS) information, and/or configuration information to acquire broadcast and multicast channels and so on.

Multicast services—Multicast is a form of group communication where information is sent to a plurality of recipients. Can be one-to-one (point-to-point) or one-to-many (point-to-multipoint) distribution. In multicast information is transmitted to intended recipients in a multicast group. Multicast services can be considered services delivered using multicast.

Additionally, or alternatively, a multicast service can be considered in which the same service and the same specific content data are provided simultaneously to a dedicated set of UEs. That is, not all UEs in the multicast coverage are authorized to receive the data.

Additionally, or alternatively, a multicast service can be considered a unidirectional point-to-multipoint service in which data is transmitted from a single source to a multicast group in the associated multicast service area. Multicast services can only be received by such users that are subscribed to the specific multicast service and have joined the multicast group associated with the specific service.

Broadcast services—Broadcast is a form of group communication where information is sent to a plurality of recipients. Can be one-to-one (point-to-point) or one-to-many (point-to-multipoint). In broadcast information is transmitted to all available recipients, for example all entities connected to a network. Broadcast services can be considered services transmitted using broadcast.

Additionally, or alternatively, a broadcast service can be considered a service in which the same service and the same specific content data are provided simultaneously to all UEs in a geographical area. That is, all UEs in the broadcast coverage area are authorized to receive the data.

Additionally, or alternatively, a broadcast service can be considered a unidirectional point-to-multipoint service in which data is transmitted from a single source to multiple UEs in the associated broadcast service area. Broadcast services may be received by all users who have enabled the specific broadcast locally on their UE and who are in the broadcast area defined for the service.

DETAILED DESCRIPTION

FIG. 1 illustrates an example of a network 100 comprising a plurality of network nodes including terminal nodes 110, access nodes 120 and one or more core nodes 129. The terminal nodes 110 and access nodes 120 communicate with each other. The one or more core nodes 129 communicate with the access nodes 120.

The network 100 is in this example a telecommunications network, in which at least some of the terminal nodes 110 and access nodes 120 communicate with each other using transmission/reception of radio waves/signals.

The one or more core nodes 129 may, in some examples, communicate with each other. The one or more access nodes 120 may, in some examples, communicate with each other.

The network 100 may be a cellular network comprising a plurality of cells 122 at least one served by an access node 120. In this example, the interface between the terminal nodes 110 and an access node 120 defining a cell 122 is a wireless interface 124.

The access node 120 is a cellular radio transceiver. The terminal nodes 110 are cellular radio transceivers.

In the example illustrated the cellular network 100 is a third generation Partnership Project (3GPP) network in which the terminal nodes 110 are user equipment (UE) and the access nodes 120 are base stations (for example, gNBs).

In the particular example illustrated the network 100 is an Evolved Universal Terrestrial Radio Access network (E-UTRAN). The E-UTRAN consists of E-UTRAN NodeBs (eNBs), providing the E-UTRA user plane and control plane (for example, RRC) protocol terminations towards the UE. The eNBs 120 are interconnected with each other by means of an X2 interface 126. The eNBs are also connected by means of the S1 interface 128 to the Mobility Management Entity (MME) 129.

In other example the network 100 is a Next Generation (or New Radio, NR) Radio Access network (NG-RAN). The NG-RAN consists of gNodeBs (gNBs), providing the user plane and control plane (for example, RRC) protocol terminations towards the UE. The gNBs are interconnected with each other by means of an X2/Xn interface 126. The gNBs are also connected by means of the N2 interface 128 to the Access and Mobility management Function (AMF).

A terminal node 110 can request system information from the network 100, such as from a serving gNB.

For example, a terminal node 110 can request one or more system information messages and/or one or more system information blocks (SIBs) from the network 100. In examples, the request can depend on the connection state of the terminal node 110.

A terminal node 110 can provide an indication of interest in one or more services, such as one or more Multicast/Broadcast services (MBS) provided by the network 100, for example by transmitting an indication of interest to a serving gNB.

Figure 2:
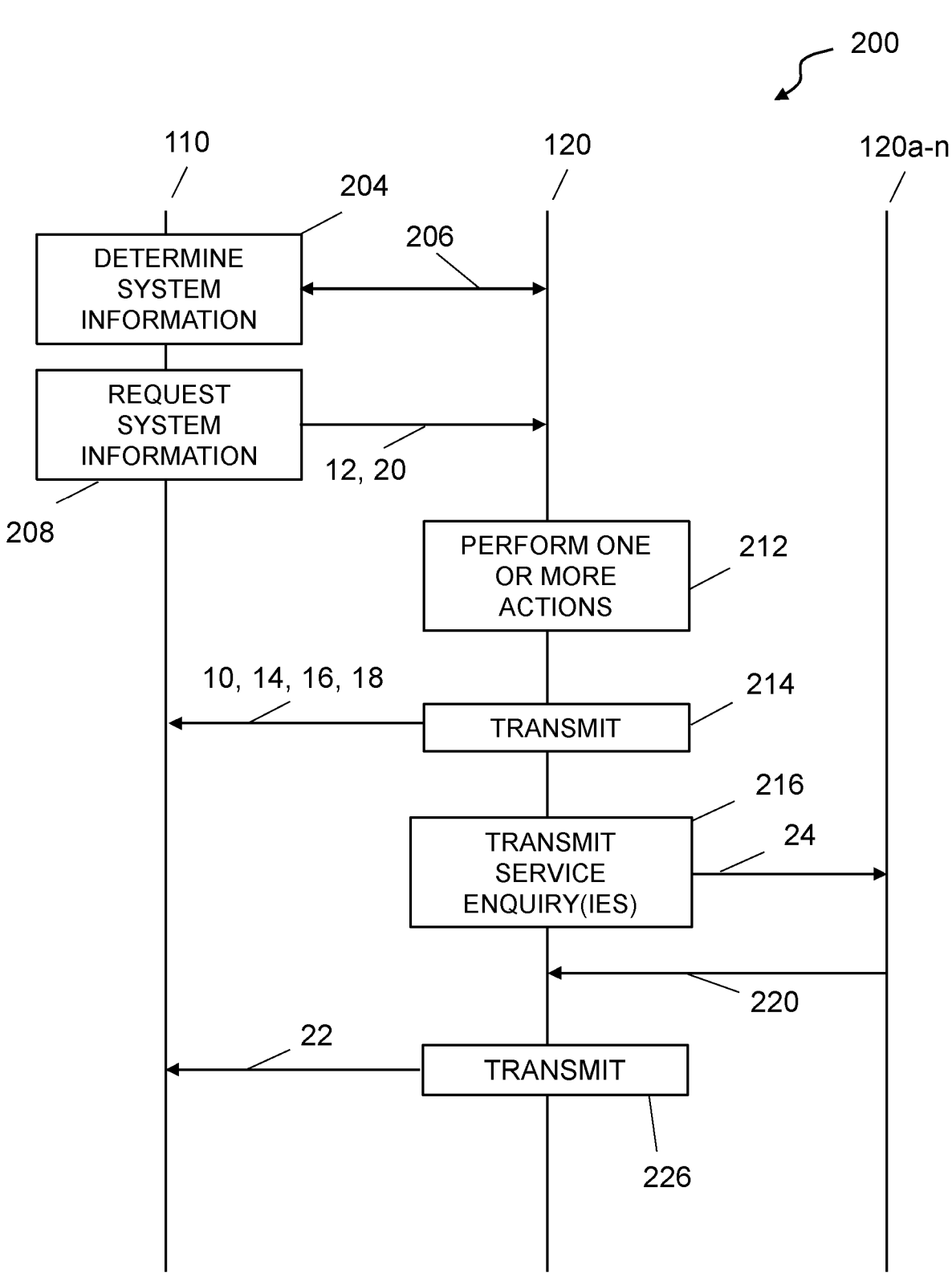
FIG. 2 shows another example of the subject matter described herein.

FIG. 2 illustrates an example of a method 200.

In examples, FIG. 2 can be considered to illustrate a plurality of methods. For example, FIG. 2 illustrates one or more actions at a plurality of actors/entities. In examples, FIG. 2 can be considered to illustrate a plurality of methods performed by the individual actors/entities.

One or more of the features discussed in relation to FIG. 2 can be found in one or more of the other figures.

In the example of FIG. 2, a plurality of apparatuses transmit and/or receive one or more signals and/or one or more messages across and/or via and/or using a network. In examples, any suitable form of communication in any suitable network can be used. For example, at least a portion of the network 100 of FIG. 1 can be used.

Accordingly, in examples, the plurality of apparatuses in FIG. 2 form at least a portion of a network 100 as described in relation to FIG. 1.

In the illustrated example, a terminal node 110, such as a UE, and a plurality of access nodes 120, 120*a*-*n*, such as a plurality of gNBs, transmit and/or receive one or more signals and/or one or more messages.

In examples, communications and/or transmissions between elements illustrated in FIG. 2 can proceed via any number of intervening elements, including no intervening elements.

In examples, any suitable number of network nodes can be included. For example, a plurality of terminal nodes 110 can be included.

At block 204 the method 200 comprises determining system information 10 available from a network 100.

In the example of FIG. 2 the location of the blocks indicates the entity performing the action(s). For example, in FIG. 2 block 204 is performed at and/or by the terminal node 110.

Any suitable method for determining system information 10 available from a network can be used.

As used herein, the term "determining" (and grammatical variants thereof) can include, not least: calculating, computing, processing, deriving, investigating, looking up (for example, looking up in a table, a database or another data structure), ascertaining and the like. Also, "determining" can include receiving (for example, receiving information), accessing (for example, accessing data in a memory) and the like. Also, "determining" can include resolving, selecting, choosing, establishing, and the like.

In examples, determining system information 10 available from a network 100 comprises transmitting and/or receiving one or more signals and/or messages, for example to/from an access node 120, such as a gNB. This is illustrated in the example of FIG. 2 by the double headed arrow labelled 206.

In some examples, determining system information 10 available from a network 100 comprises determining scheduling of system information 10 and/or broadcast status of system information 10 from a network 100.

For example, determining system information 10 available from a network 100 can comprise determining if and/or when system information 10 will be broadcast by the network 100 and/or system information 10 allowed to be obtained on-demand.

In some examples, determining system information 10 available from a network 100 comprises receiving one or more system information messages 18 and/or a master information block and/or one or more SIBs 16 from the network 100. For example, SIB1.

In examples, determining system information 10 available from a network comprises determining one or more system information messages 18 and/or one or more SIBs 16 available from the network 100.

In some examples, system information 10 as used herein can be considered to comprise and/or be one or more system messages 18 and/or one or more SIBs 16.

In some examples, determining system information 10 available from a network 100 comprises determining if system information 10 that contains information regarding at least one or more multicast and/or broadcast services 14 and/or other configuration related to one or more multicast and/or broadcast services 14 is available from the network 100.

For example, determining if at least one or more multicast and/or broadcast service system information messages 18 and/or SIBs 16 are available from the network 100.

In examples, a multicast and/or broadcast service system information message 18 and/or SIB 16 can be considered a multimedia broadcast multicast service (MBMS) system information message 18 and/or SIB 16 and/or a MBMS related message 18 and/or SIB 16.

In examples, a multicast and/or broadcast service system information message 18 and/or SIB 16 can be considered a Multicast/Broadcast Service (MBS) system information message 18 and/or SIB 16 and/or a MBS related message 18 and/or SIB 16.

In some examples, determining system information 10 available from a network 100 can be considered determining system information 10 available from an access node 120, for example a serving access node 120.

At block 208, the method 200 comprises requesting system information 10 from the network 100, wherein the request for system information 10 comprises an indication of interest 12 in at least one or more multicast and/or broadcast services 14.

Consequently, FIG. 2 illustrates a method 200 comprising: determining system information 10 available from a network 100; and requesting system information 10 from the network 100, wherein the request for system information 10 comprises an indication of interest 12 in at least one or more multicast and/or broadcast services 14.

In examples, requesting system information 10 from the network 100 can be considered requesting system information 10 from an access node 120.

In examples, the requested system information 10 can comprise and/or be at least a portion of the system information 10 determined at block 204.

For example, requesting system information 10 can comprise requesting system information 10 determined as available and/or not broadcast and/or allowed to be obtained on-demand at block 204.

Any suitable method for requesting system information 10 from the network 100 can be used.

Additionally, or alternatively, the request for system information 10 can have any suitable form. For example, the request can comprise/be an on-demand system information request RRC message.

In examples, requesting system information 10 from the network 100 comprises transmitting one or more signals to an access node 120, such as a gNB.

As FIG. 2 illustrates one or more actions of transmission, FIG. 2 also illustrates the corresponding receiving feature(s)/action(s) and vice versa.

For example, from the point of view of the access node 120, FIG. 2 illustrates receiving a request for system information 10, wherein the request for system information 10 comprises an indication of interest 12 in at least one or more multicast and/or broadcast services 14.

In some examples, requesting system information 10 from the network 100 comprises requesting one or more SIBs 16 and/or one or more system information messages 18 from the network 100.

Accordingly, in examples, determining system information 10 available from a network 100 comprises determining one or more SIBs 16 and/or one or more system information messages 18 available from a network 100 and requesting system information 10 from the network 100 comprises requesting one or more SIBs 16 and/or one or more system information messages 18 from the network.

From the point of view of the access node 120, receiving a request for system information 10 can comprise receiving a request for one or more SIBs 16 and/or one or more system information messages 18.

In examples, the request for system information 10 can be for any system information 10, such as any system information message(s) 18 and/or any SIB(s) 16.

In some examples, requesting system information 10 from the network 100 comprises requesting system information 10 that contains information regarding at least one or more multicast and/or broadcast services 14 and/or other configuration related to at least one or more multicast and/or broadcast services 14.

For example, information regarding multicast and/or broadcast service(s) 14 available in the current cell/serving cell and/or neighboring cells.

Requesting system information 10 from the network 100 can comprise requesting a multicast and/or broadcast service system information message 18 and/or SIB 16.

Requesting system information 10 from the network 100 can comprise requesting a multimedia broadcast multicast service (MBMS) system information message 18 and/or MBMS SIB 16.

Requesting system information 10 from the network 100 can comprise requesting an MBS system information message 18 and/or MBS SIB 16.

In some examples, requesting system information 10 from the network 100 comprises requesting the system information area to which the serving cell belongs, for example the system information area ID.

From the point of view of the access node 120, FIG. 2 illustrates receiving a request, the request requesting information and/or having a form as described above and/or herein.

In examples, the indication of interest 12 in at least one or more multicast and/or broadcast services 14 can have any suitable form and can be made in any suitable way.

The indication of interest 12 in at least one or more multicast and/or broadcast services 14 can be referred to as an or the indication of interest 12.

In some examples, the form and/or content of the indication of interest 12 can be configured by the network 100.

In some examples, the indication of interest 12 can be explicit or implicit.

In examples, the indication of interest 12 is implied by the form and/or content of the request for system information 10.

In some examples, the indication of interest 12 in at least one or more multicast and/or broadcast services 14 is implicit from a request for system information 10 that contains information regarding at least one or more multicast and/or broadcast services 14 and/or other configuration related to at least one or more multicast and/or broadcast services 14.

For example, the indication of interest 12 can be implied by a request for an MBMS and/or MBS related system information message 18 and/or MBMS and/or MBS related SIB 16.

For example, the indication of interest 12 can be implied by a request for an MBMS and/or MBS system information message 18 and/or MBMS and/or MBS SIB 16.

Accordingly, in examples, the indication of interest 12 can be derived from the request for system information 10 that contains information regarding at least one or more multicast and/or broadcast services 14 and/or other configuration related to at least one or more multicast and/or broadcast services 14.

That is, in examples, the access node 120 can infer and/or derive from the indication of interest 12 from, at least, the form and/or content of the request for system information 10.

For example, if the terminal node 110 is requesting system information regarding at least one or more multicast and/or broadcast services 14, the access node 120 can infer and/or derive an associated indication of interest 12.

In some examples, the indication of interest 12 can comprise/be an explicit indication of interest 12.

In examples, the indication of interest 12 comprises at least one of: a general indication of interest in multicast and/or broadcast services 14; at least one identification of a multicast and/or broadcast service 14; and a request for information regarding at least one multicast and/or broadcast service 14.

For example, the indication of interest 12 can comprise/be a bit in an information element (IE) indicating the terminal node 110 is interested in multicast and/or broadcast services 14 generally.

Additionally, or alternatively, the indication of interest 12 can comprise/be a list of the multicast and/or broadcast service(s) 14 the terminal node 110 is interested in and/or a list of the multicast and/or broadcast service(s) 14 that are known by the terminal node 110 to be locally provided.

In some examples, the terminal node 110 already has knowledge of the multicast and/or broadcast service(s) available in the cell through prior acquisition of system information 10 carrying multicast and/or broadcast service information in a different cell belonging to the substantially same information area as the cell the terminal node 110 is currently on.

In such examples, the terminal node 110 can use the prior knowledge of multicast and/or broadcast service(s) 14 in the indication of interest 12. For example, the terminal node 110 can use the prior knowledge in identifying one or more multicast and/or broadcast services 14 and/or requesting information regarding one or more multicast and/or broadcast services 14.

In some examples, requesting system information 10 from the network 100 comprises transmitting at least one message 20 including the indication of interest in at least one or more multicast and/or broadcast services 14.

Accordingly, in examples, the request, received by/at the access node 120, comprises at least one message 20 including the indication of interest 12 in at least one or more multicast and/or broadcast services 14.

The at least one message 20 can comprise any suitable information and can have any suitable form.

In examples, the at least one message 20 comprises information to request the system information 10. For example, the at least one message 20 can comprise information to request one or more system information messages 18 and/or one or more SIBs 16.

In examples, the at least one message 20 comprises information to request one or more system information messages 18 and/or SIBs 16 containing information regarding at least one or more multicast and/or broadcast services 14 and/or other configuration related to at least one or more multicast and/or broadcast services 14.

For example, the at least one message 20 can comprise information to request one or more MBMS system information messages 18 and/or SIBs 16 and/or one or more MBMS related system information messages 18 and/or SIBs 16.

For example, the at least one message 20 can comprise information to request one or more MBS system information messages 18 and/or SIBs 16 and/or one or more MBS related system information messages 18 and/or SIBs 16.

In examples, the at least one message 20 comprises one or more information elements (IE).

In some examples, the terminal node 110 can use one or more IEs in making the request.

For example, the terminal node 110 can use requested-SIB-List IE to request one or more SIBs 16, including, in some examples, an MBMS/MBS SIB 16.

In some examples, requesting system information 100 comprises using the DedicatedSIBRequest message.

In examples, the DedicatedSIBRequest message includes the indication of interest 12. For example, the DedicatedSIBRequest message can include one or more IEs to provide the indication of interest 12.

At block 212, the method 200 comprises performing one or more actions based, at least in part, on the received indication of interest 12 in at least one or more multicast and/or broadcast services 14.

Consequently, FIG. 2 illustrates a method 200 comprising:

receiving a request for system information 10, wherein the request for system information 10 comprises an indication of interest 12 in at least one or more multicast and/or broadcast services 14; and performing one or more actions based, at least in part, on the received indication of interest 12 in at least one or more multicast and/or broadcast services 14.

In examples, performing one or more actions can comprise performing any suitable action in any suitable way.

In examples, performing one or more actions comprises determining information and/or transmitting and/or receiving one or more signals. For example, performing one or more actions can comprise transmitting one or more signals to the terminal node 110 and/or one or more other network nodes.

The example of FIG. 2 illustrates examples of actions that can be performed.

At block 214, the method 200 comprises transmitting information to the terminal node 110. In examples, any suitable information can be transmitted to the terminal node 110 in any suitable way.

In examples, block 214 comprises transmitting at least one or more multicast and/or broadcast services 14 and/or information regarding at least one or more multicast and/or broadcast services to an apparatus from which the indication of interest 12 was received, in response to the indication of interest 12 in at least one or more multicast and/or broadcast services 14.

Accordingly, in examples, performing one or more actions comprises transmitting at least one or more multicast and/or broadcast services 14 and/or information regarding at least one or more multicast and/or broadcast services to an apparatus from which the indication of interest 12 was received, in response to the indication of interest 12 in at least one or more multicast and/or broadcast services.

From the point of view of the terminal node 110, FIG. 2 illustrates receiving at least one or more multicast and/or broadcast services 14 and/or information regarding at least one or more multicast and/or broadcast services 14, in response to the indication of interest 12 in at least one or more multicast or broadcast services 14.

In some examples, method 200 comprises transmitting the requested system information 10 to the apparatus that made the request. In examples, the system information 10 can be in the form of one or more system messages 18 and/or one or more SIBs 16.

In examples, transmitting the requested system information 10 to the apparatus that made the request comprises transmitting at least one RRC reconfiguration message comprising the requested system information 10 to the apparatus that made the request.

In examples, the terminal node 110 can store at least part of the received information at block 214. For example, the terminal node 110 can store system information regarding one or more multicast and/or broadcast services 14 for subsequent use, for example if the terminal node 110 changes cells.

Although block 214 is illustrated as a single block in FIG. 2, in examples a plurality of transmissions at different times can be made to the terminal node 110.

For example, one or more multicast and/or broadcast services 14 can be transmitted/received separately from system information 10, 16, 18.

In some examples, performing one or more actions comprises: in response to receiving the indication of interest in at least one or more multicast and/or broadcast service 14, transmitting at least one or more multicast and/or broadcast service enquiries 24 to at least one or more neighboring access nodes 120a-n.

This is illustrated at block 216 in FIG. 2.

In examples, the at least one or more multicast and/or broadcast service enquiries 24 can comprise any suitable information and have any suitable form.

For example, the at least one or more multicast and/or broadcast service enquiries 24 can be configured to enquire available multicast and/or broadcast services from neighboring access nodes 120 and/or planned availability of such service(s).

In examples, the at least one or more multicast and/or broadcast service enquiries 24 can be configured to enquire availability of one or more multicast and/or broadcast services identified in the indication of interest 12 and/or planned availability of such service(s).

In some examples, the at least one or more multicast and/or broadcast service enquiries 14 are transmitted if it is determined that the access node 120 cannot provide at least one multicast and/or broadcast service 14 identified in the indication of interest 12.

In examples, performing one or more actions comprises receiving at least one response to the at least one or more multicast and/or broadcast service enquiries 24 from at least one or more neighboring access nodes 120a-n; and transmitting, based at least in part on the received at least one response, one or more signals to an apparatus from which the indication of interest was received. In the example of FIG. 2, this is the terminal node 110.

This is illustrated in FIG. 2 by blocks 220 and 226.

In examples, the one or more signals can comprise at least one RRC reconfiguration message 22.

Accordingly, in examples, performing one or more actions comprises receiving at least one response to the at least one or more multicast and/or broadcast service enquiries 24 from at least one or more neighboring access nodes 120a-n; and transmitting, based at least in part on the received at least one response, at least one RRC reconfiguration message 22 to an apparatus from which the indication of interest was received. In the example of FIG. 2, this is the terminal node 110.

From the point of view of the terminal node 110, FIG. 2 illustrates receiving at least one RRC reconfiguration message 22 in response to the indication of interest 12 in at least one or more multicast and/or broadcast services 14.

In examples, the RRC reconfiguration message(s) 22 can be configured to cause any suitable reconfiguration at the terminal node 110.

In examples, the RRC reconfiguration message(s) 22 are transmitted if it is determined that one or more neighboring access nodes 120 can provide one or more multicast and/or broadcast services 14 of interest to the terminal node 110.

In some examples, the RRC message(s) 22 can are configured to cause one or more mobility actions at the terminal node 110, and/or to cause one or more handover procedures to occur at the terminal node 110 and/or to cause at least one RRC state change at the terminal node 110.

For example, the RRC message(s) 22 can be configured to cause the terminal node 110 to handover to a neighboring access node 120 that is configured to provide one or more multicast and/or broadcast services 14 of interest.

In some examples, the information in the RRC reconfiguration message 22 can be stored by the terminal node 110 and used in idle state mobility decisions, for example cell reselection decisions.

In some examples, the one or more signals comprise information indicating that at least one or more multicast and/or broadcast services 14 identified in the indication of interest 12 are unavailable.

Accordingly, in examples, method 200 comprises, at block 226, transmitting information indicating that at least one or more multicast and/or broadcast services 14 identified in the indication of interest 12 are unavailable.

In examples, the access node 120 can use the indication of interest 12 in mobility decisions, for example handover decisions.

In examples, one or more of blocks 214, 216, 220 and 226 can be omitted.

Although FIG. 2 illustrates a method 200 involving a terminal node 110 and a plurality of access nodes 120, 120a-n, FIG. 2 should also be considered to disclose a plurality of methods performed by the terminal node 110 and/or by the access node 120 and/or by the access node(s) 120a-n.

Accordingly, FIG. 2 also discloses a method comprising one or more actions performed by the terminal node 110, which can be considered an apparatus.

Accordingly, FIG. 2 also discloses a method comprising one or more actions performed by the access node 120, which can be considered an apparatus.

In examples, one or more of the blocks of FIG. 2 can be omitted. For example, block 214, 216, 220 and/or 226 can be omitted.

Examples described herein are advantageous. For example, examples of the disclosure provide for a terminal node to indicate interest in multicast and/or broadcast service(s) as part of the process to obtain system information.

In examples, a terminal node can indicate interest in multicast and/or broadcast service(s) as part of the process to obtain system information regarding such services.

Examples of the disclosure therefore reduce latency and signaling overhead in such procedures.

Figure 3:
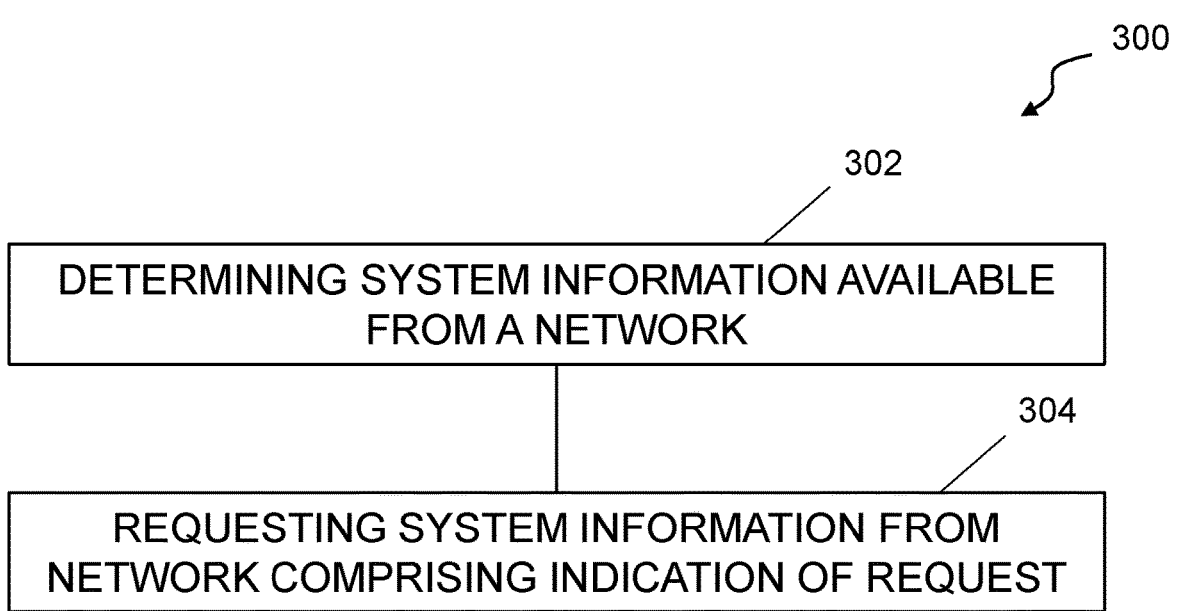
FIG. 3 shows another example of the subject matter described herein.

FIG. 3 illustrates an example of a method 300.

In examples, the method 300 can be performed by any suitable apparatus comprising any suitable means for performing the method 300.

In examples, the method 300 is performed by a terminal node 110, such as a UE.

At block 302, the method 300 comprises determining system information 10 available from a network 100.

At block 304, the method 300 comprises requesting system information 10 from the network 100, wherein the request for system information 10 comprises an indication of interest 12 in at least one or more multicast and/or broadcast services 14

Consequently, FIG. 3 illustrates a method 300 comprising:

determining system information 10 available from a network 100; and requesting system information from the network 100, wherein the request for system information 10 comprises an indication of interest in at least one or more multicast and/or broadcast services 14.

Figure 4:
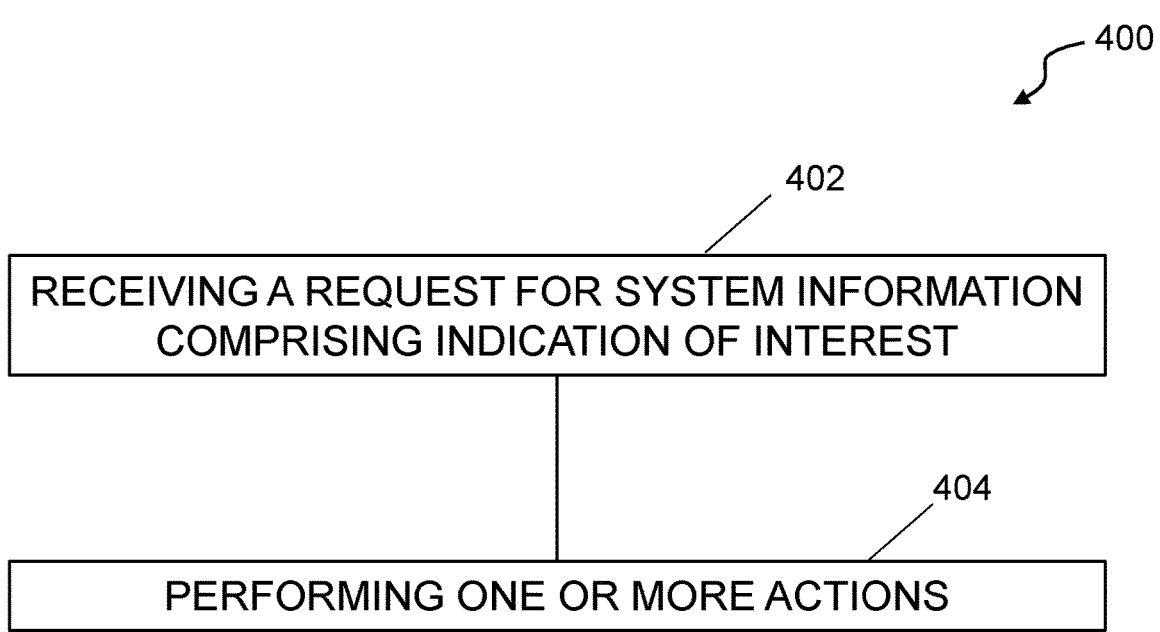
FIG. 4 shows another example of the subject matter described herein.

FIG. 4 illustrates an example of a method 400.

In examples, the method 400 can be performed by any suitable apparatus comprising any suitable means for performing the method 400.

In examples, the method 400 is performed by an access node 120, such as a gNB.

At block 402, the method 400 comprises receiving a request for system information 10, wherein the request for system information comprises an indication of interest 12 in at least one or more multicast and/or broadcast services 14.

At block 404, the method 400 comprises performing one or more actions based, at least in part, on the received indication of interest in at least one or more multicast and/or broadcast services 14.

Consequently, FIG. 4 illustrated a method 400 comprising:

receiving a request for system information 10, wherein the request for system information 10 comprises an indication of interest 12 in at least one or more multicast and/or broadcast services 14; and performing one or more actions based, at least in part, on the received indication of interest 12 in at least one or more multicast and/or broadcast services 14.

Figure 5:
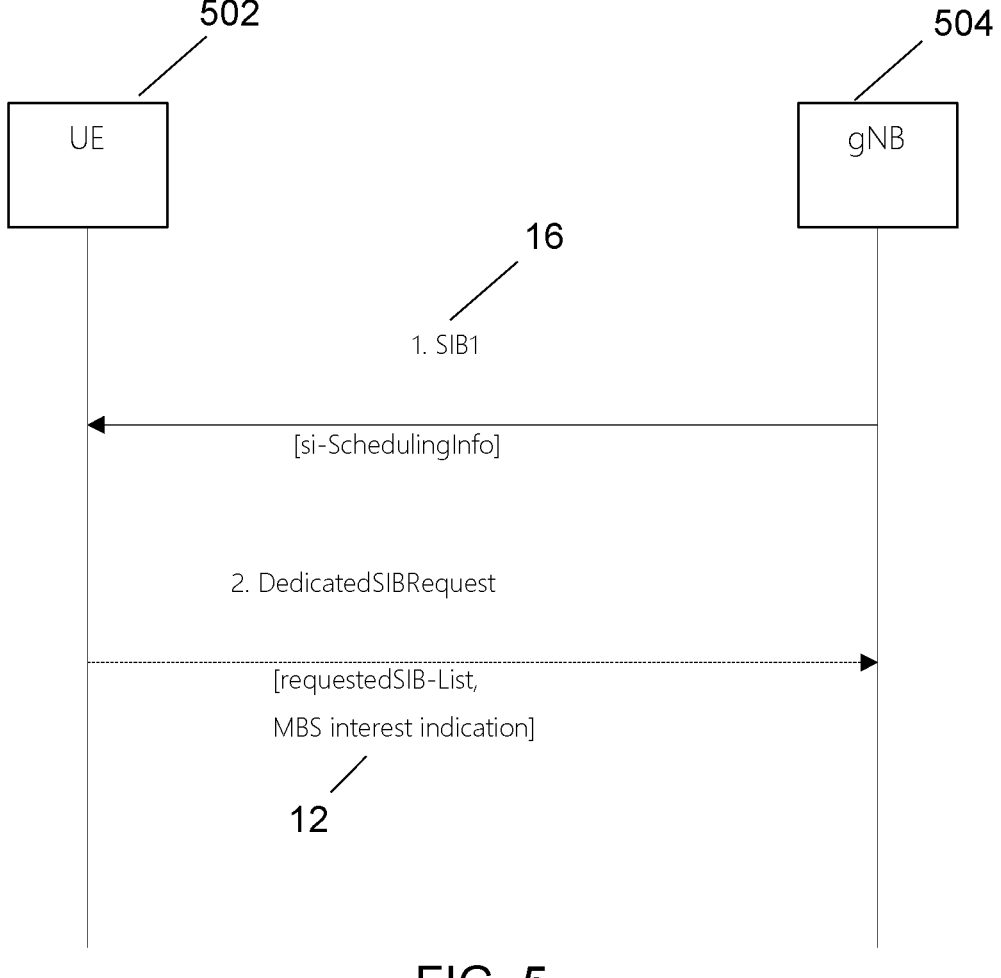
FIG. 5 shows another example of the subject matter described herein.
Figure 6:
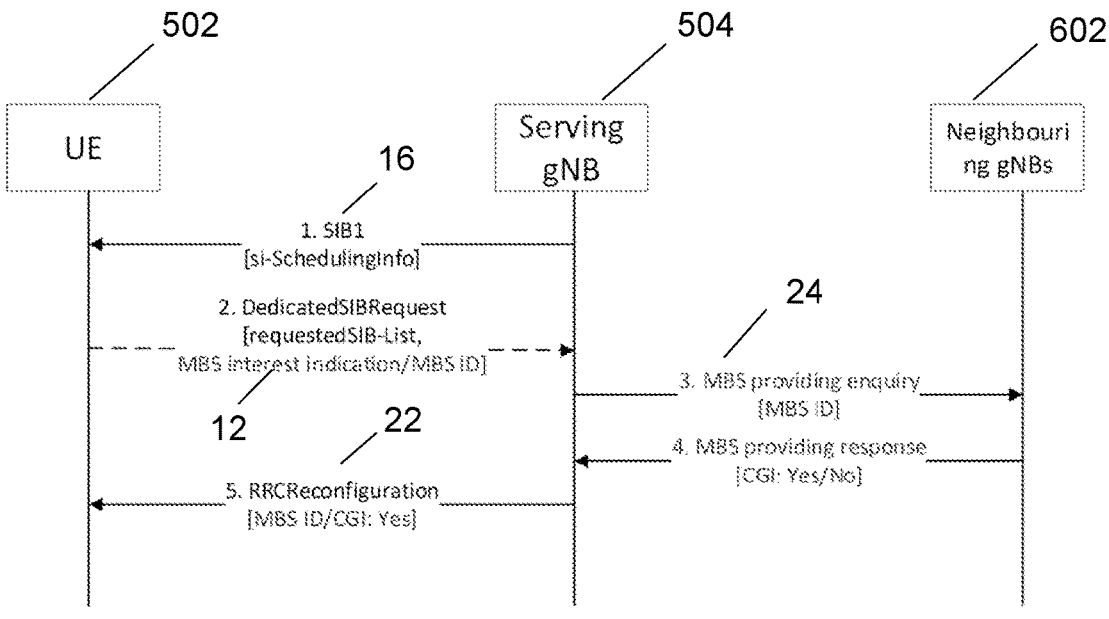
FIG. 6 shows another example of the subject matter described herein.

Some examples relate to 3GPP network. FIGS. 5 and 6 can be considered to illustrate some such examples.

In the example of FIG. 5, a UE 502 and a gNB 504 communicate across a network.

In block 1, of FIG. 5, the network broadcasts the SIB1 16 and provides the scheduling information for SIBs 16 broadcast or allowed to be obtained on-demand.

It includes scheduling information for the SIB 16 that carries the MBMS/MBS service information.

If the scheduling information in SIB1 16 indicates for the MBMS/MBS SIB 16 the si-BroadcastStatus as 'notBroadcasting' the UE 502 is allowed to request the MBMS/MBS SIB 16 when needed.

In block 2, of FIG. 5, the UE 502 sends the Dedicated-SIBRequest message to request the MBMS/MBS SIB 16. If the UE 502 already knows from prior acquisition of MBMS/MBS SIB 16 in another cell that belongs to the substantially same system information area as the current cell, the UE 502 can include MBMS/MBS interest indication 12 to indicate interest in MBMS/MBS services while trying to get an updated MBMS/MBS SIB 16, on-demand, in the current cell.

The example of FIG. 6 is similar to the example of FIG. 5. However, in the example of FIG. 6 a UE 502, a gNB 504, and neighbouring gNBs 602 communicate across a network.

The message sequence of FIG. 5 is further elaborated in FIG. 6.

In block 2, of FIG. 6, the UE 502 indicates interested MBMS/MBS ID in DedicatedSIBRequest.

In block 3, of FIG. 6, the serving gNB 504 enquires neighbour gNBs 602 whether the indicated MBMS/MBS is provided or plan to be provided in a cell of neighbour gNBs 602.

In block 4, of FIG. 6, the serving gNB 504 gets response from neighbour gNBs 602 with "Yes/No" of relative cell ID.

In block 5, of FIG. 6, the serving gNB 504 sends to UE 502 via RRCReconfiguration 22, the MBMS ID/CGI/YES.

Examples of the disclosure are advantageous. For example, examples of the disclosure provide for a reduction in overall latency and signaling overhead in indicating interest in and/or accessing one or more multicast and/or broadcast service 14.

Figures 7A, 7B:
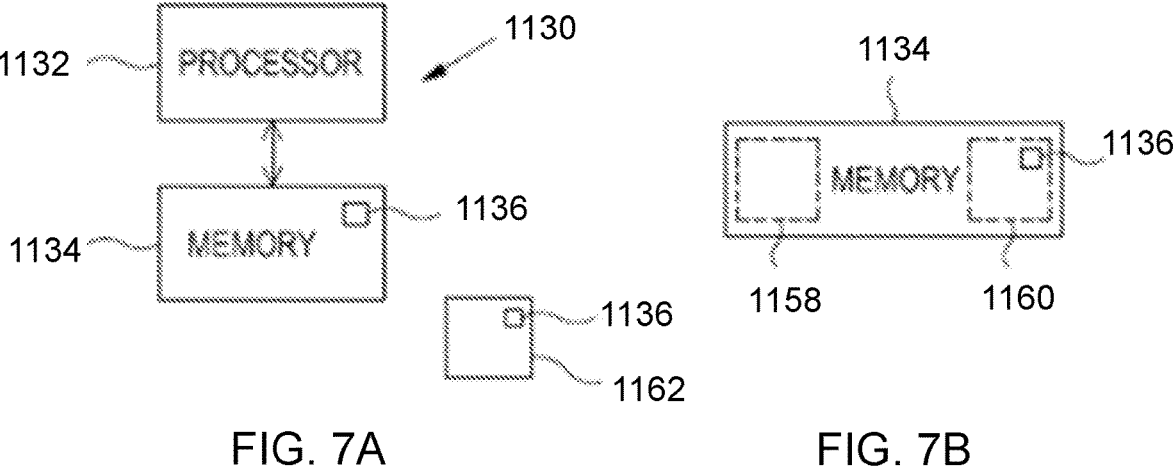
FIG. 7A shows another example of the subject matter described herein.
FIG. 7B shows another example of the subject matter described herein.

FIG. 7A illustrates an example of a controller 1130. The controller 1130 can be used in an apparatus such as a network node 110, 120, such as a mobile terminal or UE and/or a gNB. Implementation of a controller 1130 may be as controller circuitry. The controller 1130 may be implemented in hardware alone, have certain aspects in software including firmware alone or can be a combination of hardware and software (including firmware).

As illustrated in FIG. 7A the controller 1130 may be implemented using instructions that enable hardware functionality, for example, by using executable instructions of a computer program 1136 in a general-purpose or special-purpose processor 1132 that may be stored on a computer readable storage medium (disk, memory etc) to be executed by such a processor 1132.

The processor 1132 is configured to read from and write to the memory 1134. The processor 1132 may also comprise an output interface via which data and/or commands are output by the processor 1132 and an input interface via which data and/or commands are input to the processor 1132.

The memory 1134 stores a computer program 1136 comprising computer program instructions (computer program code) that controls the operation of the apparatus when loaded into the processor 1132. The computer program instructions, of the computer program 1136, provide the logic and routines that enables the apparatus to perform the methods illustrated in FIGS. 2 and/or 3 and/or 4 and/or 5 and/or 6. The processor 1132 by reading the memory 1134 is able to load and execute the computer program 1136.

The apparatus therefore comprises:

at least one processor 1132; and at least one memory 1134 including computer program code the at least one memory 1134 and the computer program code configured to, with the at least one processor 1132, cause the apparatus at least to perform:

determining system information available from a network; and requesting system information from the network, wherein the request for system information comprises an indication of interest in at least one or more multicast and/or broadcast services.

The apparatus therefore comprises:

at least one processor 1132; and at least one memory 1134 including computer program code the at least one memory 1134 and the computer program code configured to, with the at least one processor 1132, cause the apparatus at least to perform:

receiving a request for system information, wherein the request for system information comprises an indication of interest in at least one or more multicast and/or broadcast services; and performing one or more actions based, at least in part, on the received indication of interest in at least one or more multicast and/or broadcast services.

As illustrated in FIG. 7A, the computer program 1136 may arrive at the apparatus via any suitable delivery mechanism 1162. The delivery mechanism 1162 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 1136. The delivery mechanism may be a signal configured to reliably transfer the computer program 1136. The apparatus may propagate or transmit the computer program 1136 as a computer data signal.

Computer program instructions for causing an apparatus to perform at least the following or for performing at least the following:

determining system information available from a network; and requesting system information from the network, wherein the request for system information comprises an indication of interest in at least one or more multicast and/or broadcast services.

Computer program instructions for causing an apparatus to perform at least the following or for performing at least the following:

receiving a request for system information, wherein the request for system information comprises an indication of interest in at least one or more multicast and/or broadcast services; and performing one or more actions based, at least in part, on the received indication of interest in at least one or more multicast and/or broadcast services.

The computer program instructions may be comprised in a computer program, a non-transitory computer readable medium, a computer program product, a machine readable medium. In some but not necessarily all examples, the computer program instructions may be distributed over more than one computer program.

Although the memory 1134 is illustrated as a single component/circuitry it may be implemented as one or more separate components/circuitry some or all of which may be integrated/removable and/or may provide permanent/semi-permanent/dynamic/cached storage.

In examples the memory 1134 comprises a random access memory 1158 and a read only memory 1160. In examples the computer program 1136 can be stored in the read only memory 1158. See, for example, FIG. 7B

In some examples the memory 1134 can be split into random access memory 1158 and read only memory 1160.

Although the processor 1132 is illustrated as a single component/circuitry it may be implemented as one or more separate components/circuitry some or all of which may be integrated/removable. The processor 1132 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 2 and/or 3 and/or 4 and/or 5 and/or 6 may represent steps in a method and/or sections of code in the computer program 1136. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

Thus, the apparatus can, in examples, comprise means for:

determining system information available from a network; and requesting system information from the network, wherein the request for system information comprises an indication of interest in at least one or more multicast and/or broadcast services.

Thus, the apparatus can, in examples, comprise means for:

receiving a request for system information, wherein the request for system information comprises an indication of interest in at least one or more multicast and/or broadcast services; and performing one or more actions based, at least in part, on the received indication of interest in at least one or more multicast and/or broadcast services.

In examples, an apparatus can comprise means for performing one or more methods, or at least part of one or more methods, as disclosed herein.

In examples, an apparatus can be configured to perform one or more methods, or at least part of one or more methods, as disclosed herein.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

Abbreviations:

CGI—Cell Global Identifier
DL-SCH—Downlink Shared Channel
gNB—gNodeB
IE—Information Element
MIB—Master Information Block
MBMS—Multimedia Broadcast Multicast Service
MBS—Multicast/broadcast service
NR—New Radio
PTP—Point to Point
PTM—Point to Multipoint
RAN—Radio Access Network
RRC—Radio Resource Control
SI—System Information
SIB—System Information Block SIB—System Information Block type 1
3GPP—Third Generation Partnership Project
UE—User equipment

What is claimed is:

1. An terminal node comprising:

at least one processor; and at least one memory including computer program code;

the at least one memory and the computer program code configured to, with the at least one processor, cause the terminal node to perform:

determining system information available from a network, wherein determining system information available from a network comprises determining one or more system information block, SIBs, and one or more system information messages available from a network;

requesting system information from the network, wherein the request for system information comprises an indication of interest in at least one or more multicast and/or broadcast services, wherein requesting system information from the network comprises requesting one or more system information blocks (SIBs) and one or more system information messages from the network, and wherein the request comprises a Dedicated-SIBRequest RRC message that carries the indication in one or more information elements, receiving the at least one or more multicast and/or broadcast services from the network; and receiving the requested system information in the determined one or more SIBs and one or more system information messages from the network.

2. The terminal node as claimed in claim 1, wherein the DedicatedSIBRequest RRC message comprises a requestedSIB-List information element identifying at least one or more system information blocks that contain information regarding at least one or more multicast and broadcast services.

3. The terminal node as claimed in claim 1, wherein requesting system information from the network comprises requesting system information that contains information regarding at least one or more multicast and/or broadcast services and/or other configuration related to at least one or more multicast and/or broadcast services, wherein requesting system information is performed responsive to SIB1 scheduling information indicating that an MBMS/MBS SIB has si-BroadcastStatus set to notBroadcasting.

4. The terminal node as claimed in claim 3, wherein the indication of interest in at least one or more multicast and/or broadcast services is implicit from a request for system information that contains information regarding at least one or more multicast and/or broadcast services and/or other configuration related to at least one or more multicast and/or broadcast services, wherein the request comprises a requestedSIB-List information element identifying an MBMS and/or MBS SIB.

5. The terminal node as claimed in claim 1, wherein the indication of interest in at least one or more multicast and/or broadcast services comprises:

a general indication of interest in multicast and/or broadcast services;

at least one identification of a multicast and/or broadcast service; and and a request for information regarding at least one or more multicast and/or broadcast service, wherein the at least one identification comprises a list of multicast and/or broadcast services known by the terminal to be locally provided.

6. A method performed by a terminal node comprising:

determining system information available from a network, wherein determining system information available from a network comprises determining one or more system information block, SIBs, and one or more system information messages available from a network;

requesting system information from the network, wherein the request for system information comprises an indication of interest in at least one or more multicast and/or broadcast services, wherein requesting system information from the network comprises requesting one or more system information blocks (SIBs) and one or more system information messages from the network, and wherein the request comprises a DedicatedSIBRequest RRC message that carries the indication in one or more information elements, receiving the at least one or more multicast and/or broadcast services from the network; and receiving the requested system information in the determined one or more SIBs and one or more system information messages from the network.

7. The method as claimed in claim 6, wherein the DedicatedSIBRequest RRC message comprises a requestedSIB-List information element identifying at least one or more system information blocks that contain information regarding at least one or more multicast and/or broadcast services.

8. The method as claimed in claim 6, wherein requesting system information from the network comprises requesting system information that contains information regarding at least one or more multicast and/or broadcast services and/or other configuration related to at least one or more multicast and/or broadcast services, wherein the DedicatedSIBRequest RRC message includes one or more information elements that provide the indication of interest and one or more information elements that identify the requested SIBs.

9. The method as claimed in claim 8, wherein the indication of interest in at least one or more multicast and/or broadcast services is implicit from a request for system information that contains information regarding at least one or more multicast and/or broadcast services and/or other configuration related to at least one or more multicast and/or broadcast services, wherein the request specifies an MBMS and/or MBS system information message and/or an MBMS and/or MBS SIB.

10. The method as claimed in claim 6, wherein the indication of interest in at least one or more multicast and/or broadcast services comprises:

a general indication of interest in multicast and/or broadcast services;

at least one identification of a multicast and/or broadcast service; and a request for information regarding at least one or more multicast and/or broadcast service.

11. An apparatus comprising:

at least one processor; and at least one memory including computer program code;

the at least one memory and the computer program code configured to, with the at least one processor, cause the apparatus to perform:

receiving, from a terminal node, a request for system information, wherein the request for system information comprises an indication of interest in at least one or more multicast and/or broadcast services, wherein receiving the request for system information comprises receiving a request for one or more system information blocks (SIBs) and one or more system information messages from the terminal node, and wherein receiving the request for system information comprises receiving a DedicatedSIBRequest RRC message that carries the indication in one or more information elements; and performing one or more actions based, at least in part, on the received indication of interest in at least one or more multicast and/or broadcast services, wherein the one or more actions comprise:

transmitting the at least one or more multicast and/or broadcast services to the terminal node; and transmitting the requested system information in the one or more system information block, SIBs, and one or more system information messages to the terminal node.

12. The apparatus as claimed in claim 11, wherein the DedicatedSIBRequest RRC message comprises a requestedSIB-List information element identifying at least one or more system information blocks that contain information regarding at least one or more multicast and broadcast services.

13. The apparatus as claimed in claim 11, wherein the request for system information comprises a request for system information that contains information regarding at least one or more multicast and/or broadcast services and/or other configuration related to at least one or more multicast and/or broadcast services.

14. The apparatus as claimed in claim 13, wherein the indication of interest in at least one or more multicast and/or broadcast services is implicit from a request for system information that contains information regarding at least one or more multicast and/or broadcast services and/or other configuration related to at least one or more multicast and/or broadcast services.

15. The apparatus as claimed in claim 11, wherein the indication of interest in at least one or more multicast and/or broadcast services comprises:

a general indication of interest in multicast and/or broadcast services;

at least one identification of a multicast and/or broadcast service; and a request for information regarding at least one or more multicast and/or broadcast services.

16. A method performed by an access node comprising:

Receiving, from a terminal node, a request for system information, wherein the request for system information comprises an indication of interest in at least one or more multicast and/or broadcast services, wherein receiving the request for system information comprises receiving a request for one or more system information blocks (SIBs) and one or more system information messages from the terminal node, and wherein receiving the request for system information comprises receiving a DedicatedSIBRequest RRC message that carries the indication in one or more information elements; and performing one or more actions based, at least in part, on the received indication of interest in at least one or more multicast and/or broadcast services, wherein the one or more actions comprise:

transmitting the at least one or more multicast and/or broadcast services to the terminal node; and transmitting the requested system information in the one or more system information block, SIBs, and one or more system information messages to the terminal node.

17. The method as claimed in claim 16, wherein the DedicatedSIBRequest RRC message comprises a request-edSIB-List information element identifying at least one or more system information blocks that contain information regarding at least one or more multicast and broadcast services.

18. The method as claimed in claim 16, wherein the request for system information comprises a request for system information that contains information regarding at least one or more multicast and/or broadcast services and/or other configuration related to at least one or more multicast and/or broadcast services.

19. The method as claimed in claim 18, wherein the indication of interest in at least one or more multicast and/or broadcast services is implicit from a request for system information that contains information regarding at least one or more multicast and/or broadcast services and/or other configuration related to at least one or more multicast and/or broadcast services.

20. The method as claimed in claim 16, wherein the indication of interest in at least one or more multicast and/or broadcast services comprises at least:

a general indication of interest in multicast and/or broad-cast services;

at least one identification of a multicast and/or broadcast service; and a request for information regarding at least one or more multicast and/or broadcast services.

* * * * *